United States Patent [19]
Wilhelmsen

[11] 3,826,521
[45] July 30, 1974

[54] GLUED REPLACEMENT UNIT FOR REPAIRING RUPTURED PIPE

[76] Inventor: Paul C. Wilhelmsen, 281 Livorna Heights Rd., Alamo, Calif. 94507

[22] Filed: Oct. 30, 1972

[21] Appl. No.: 301,947

[52] U.S. Cl.............. 285/15, 156/98, 156/294, 285/31, 285/423, 285/DIG. 16
[51] Int. Cl.................. F16l 13/00, F16l 47/00
[58] Field of Search........ 285/31, 32, 423, DIG. 16, 285/369, 15, 337, 81, 284, 292; 156/98, 294

[56] References Cited
UNITED STATES PATENTS 2,498,831  2/1950  Veitch.................... 285/DIG. 16
2,699,344  1/1955  Bissell.................... 285/15
2,823,049  2/1958  Hombach................. 285/31
3,276,929  10/1966 Ferch...................... 285/369 X
3,488,072  1/1970  Allen et al............... 285/423 X FOREIGN PATENTS OR APPLICATIONS
1,423,092  11/1965  France..................... 285/369

*Primary Examiner*—Thomas F. Callaghan
*Attorney, Agent, or Firm*—Phillips, Moore, Weissenberger, Lempio & Strabala

[57] ABSTRACT

A method of effecting a repair to a damaged section of a rigid, plastic pipe system, utilizing a short replacement section, a conventional coupling and two sleeve type couplings.

1 Claim, 5 Drawing Figures

3,826,521

GLUED REPLACEMENT UNIT FOR REPAIRING RUPTURED PIPE

FIELD OF THE INVENTION

This invention relates to connections made between lengths of plastic pipe, and more particularly to those made to effect repairs to existing systems.

The use of poly-vinyl chlorine pipe, commonly referred to as rigid PVC pipe, has gained wide acceptance for cold water systems operating under pressures up to 200 lbs. per square inch. It is especially well suited to subterranean installations, being free from the corrosive actions to which metallic pipe is subjected, and being relatively impervious to other forms of deterioration. It is, however, a non-resilient material having a tendency to rupture if subjected to undue distortional forces, this being especially true at low temperatures. A further disadvantage in the use of this material is the fact that it has a low impact resistance and is easily damaged by contact with garden tools, rototilling equipment and the like.

Prior to my method of making repairs to existing installations, no satisfactory way of effecting such repairs had been devised whereby a damaged pipe line could be completely and expeditiously restored to its original condition. The inherent rigidity of the pipe material makes it virtually impossible to install a replacement section of pipe, using conventional, standard coupling means, without having access to a relatively long length of the system on both sides of the said replacement. In many cases, such as where a pipeline runs beneath a fence or a walkway, this problem is seriously aggravated.

SUMMARY OF THE INVENTION

The present invention can be practiced on any system in which only the damaged portion of the system is accessible. It is strictly a localized operation using repair parts of simple construction together with ease of application.

It is the principal object of the invention to provide a method of repairing a pipeline without having to expose a relatively long length of such line. A further object of the invention is the provision of simple means whereby the foregoing can be accomplished easily and quickly. A still further object of the invention is the standardization of such an operation, making it possible to package the repair components in kit form.

These and other objects of the invention will become apparent during the course of the following description and appended claims, taken in connection with the accompaning drawing forming a part hereof.

DESCRIPTION OF THE PREFERRED EMBODIMENTS

Figure 1:
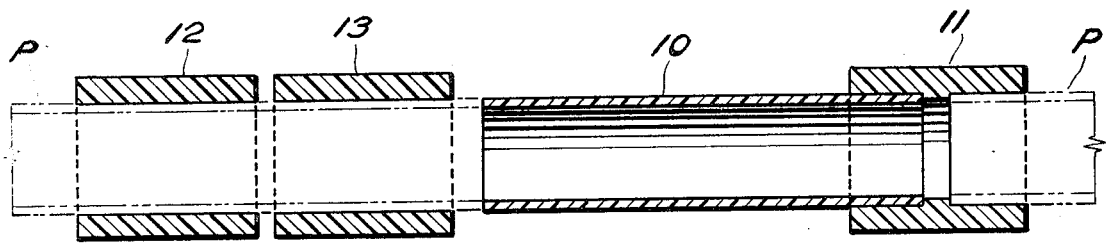
FIG. 1 is a sectional elevation of a part of an existing system (indicated in phantom), in which a damaged portion has been replaced, and showing a preliminary step in the repair operation.
Figure 2:
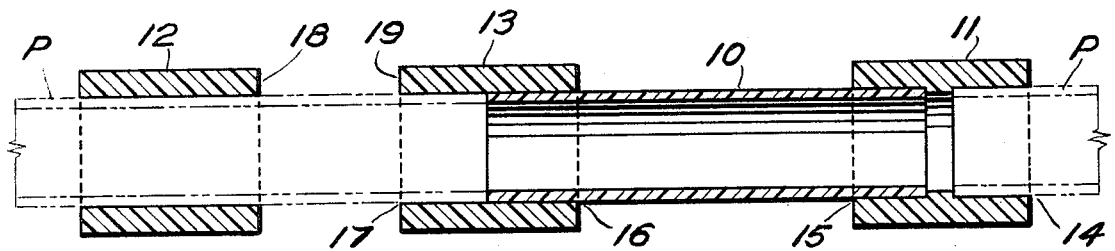
FIG. 2 is a view similar to FIG. 1, showing a further step in the process of repair.
Figure 3:
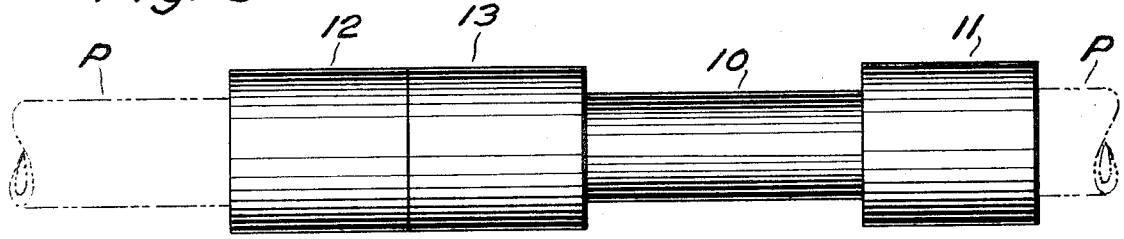
FIG. 3 is an elevation illustrating the finished joint.

Referring to the drawing in detail, two fragmentary portions of an existing pipeline P are indicated in phantom on FIGS. 1, 2 and 3. A damaged portion having been cut out of a once continuous section, it is now replaced by a relatively short length of renewal pipe 10 which has been connected to the pipe P by a conventional type coupling 11, securely sealed by an approved adhesive in the usual manner. FIG. 1 also illustrates an inner and an outer plain coupling 12 and 13, respectively, these couplings having been placed on the other portion of the pipe P as indicated.

On FIG. 2 the coupling 13 has been centered over the closely adjacent ends of the pipes P and 10, and on FIG. 3, coupling 12 has been positioned in contiguous juxtaposition with the coupling 13.

It will be noted that the couplings 12 and 13 differ from the conventional type coupling 11 in the fact that they have no inner projecting flange or shoulder, and therefore, they can be readily positioned as described. It should also be noted that while couplings 12 and 13 are of identical form, though not necessarily so, the coupling 12 actually functions as a sealing member to complete the connection.

A step by step description of my method of repair follows:

After spotting the location of the leak, remove the damaged portion of pipe to the extent that only sound material remains. While it is advisable to remove no more of the pipe than is necessary, sufficient space should be provided to prevent undue crowding of the couplings 11 and 13.

Thoroughly clean the ends of the pipe P and free them to the extent that they can be displaced laterally a sufficient amount to enable the connection of the pipe 10 and the coupling 11 to be made, and at this time, the sealing member 12 and the coupling 13 can be placed as shown on FIG. 1. Both of these units should be placed a sufficient distance from the joint to allow room for the application of adhesive to the adjacent ends of the pipes P and 10.

After the assembled parts have been brought into alignment, and the application of the cement to the pipes has been made, coupling 13 is then slid into place as shown on FIG. 2.

At this stage of the operation, perfect sealing has been accomplished at points 14, 15 and 16, however, due to the attenuation of the adhesive caused by the pulling away or wiping action of the movement of the coupling 13, it is impossible to obtain a perfect seal at point 17 unless the next described step is taken. This has been established as a fact by numerous tests.

The concluding step consists of applying additional adhesive to that portion of the pipe P extending outwardly from the coupling 13, as shown on FIG. 2, and then sliding the sealing member 12 toward coupling 13 until their vertical, confronting edges 18 and 19 are brought into contact with one another. As the sealing member 12 is pushed into place, a quantity of the adhesive is forced forward by its edge 18, as the two units are brought into contact, this adhesive is compressed by, and forms a uniform seal with the surfaces 18 and 19.

In cases where it is necessary to install a longer section 10, the members 12 and 13 can, if desired, be placed in their initial position on such section, rather than on pipe 10 as illustrated.

Figure 4:
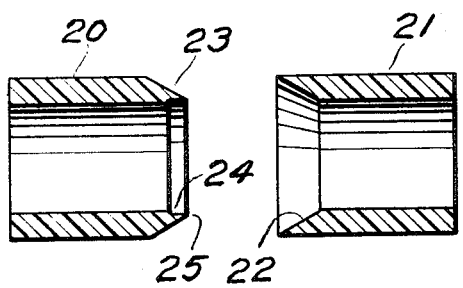
FIG. 4 is a sectional elevation of a modified design of sealing member and coupling, shown from left to right, respectively.

Referring to FIG. 4, a modified form of sealing member 20 and coupling 21 is shown. In this design, the coupling 21 is beveled internally at one end as at 22, and the sealing member 20 has one end beveled complimentary thereto, as is indicated at 23. A further modification in the deign of the sealing member resides in the fact that the interior diameter has been slightly increased for a relatively short distance 24 at the beveled end thereof.

In the application of this modified design, the coupling 21 and the seal member 20 will be placed in exactly the same manner as has been described for members 13 and 12, however, as the member 20 is slid into position, adhesive will be forced into the space between the pipe P and the enlarged bore 24. This forcing action will have a tendency to cause the edge 25 of the member 20 to flare outwardly. Upon contacting the beveled recess 22 of the coupling 21, the edge 25 will be forced back into place thus further compressing the adhesive trapped in the aforesaid space and therefore assuring a perfect seal between the two members.

Figure 5:
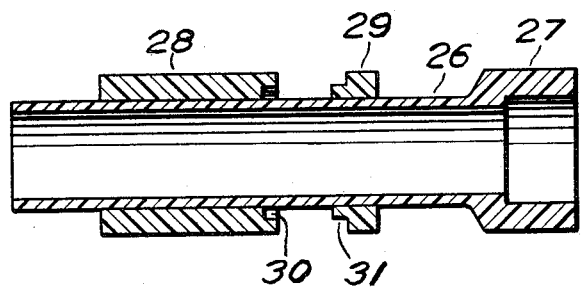
FIG. 5 is a further modification of all of the components.

The further modification shown on FIG. 5 contemplates the packaging of the components in kit form. A replacement pipe 26 is shown having a coupling 28 integral therewith. A coupling 28 and a sealing member 29 is shown mounted on the pipe 26, ready to be positioned. In this species, the coupling 28 has a counterbore 30, as indicated, and the sealing member 29, has a portion 31 of reduced diameter adapted to fit closely within the counterbore 30.

Application of this assembly follows the same procedure as that of the afore described design. The pipe 26 is, of course, cut to the correct length before its coupling end 27 is connected to a system undergoing repair. The use of the sealing member 29 makes this application especially desirable where damage is not extensive, and where it may be necessary to effect a repair in a minimum of space.

From the foregoing it will be apparent that I have provided a method and means of making repairs to plastic pipe systems, as described, which will enable such repairs to be made effecively, quickly and with a minimum of labor, and while I have illustrated and described preferred embodiments of my invention, it should be understood that modifications may be made within the spirit and intent of Title 35, United States Code, Section 112, Par. 3.

I claim:

1. A glued replacement unit for repairing ruptured polyvinyl chloride pipe with adhesives comprising:

a short length of pipe having an outside diameter closely approximating the polyvinyl chloride pipe being repaired, said length of pipe having a fixed coupling at one end thereof whereby said length of pipe can be sealingly connected to one piece of said polyvinyl chloride pipe being repaired after the ruptured section has been removed, so that its free end is abutted against the other piece of polyvinyl chloride pipe in an abutting relationship to form a butt joint; and a pair of glue sleeves, one of said sleeves adapted to be telescoped on the outer diameter of said polyvinyl chloride pipe being repaired and the other of said sleeves telescoped on said length of pipe so that one of said sleeves can be slid over said butt joint after it has been glued and the other of said sleeves can be slid into abutting relationship with the sleeve over the butt joint after it has been glued whereby a positive seal is accomplished which is free of leakage due to glue-starved areas in the joint as a result of seals formed by the several sleeves.

* * * * *